United States Patent
Sosa et al.

(10) Patent No.: US 6,437,043 B1
(45) Date of Patent: Aug. 20, 2002

(54) PROCESS AND APPARATUS FOR CONTINUOUS MANUFACTURE OF ELASTOMER-MODIFIED MONOVINYLAROMATIC COMPOUNDS

(75) Inventors: Jose M. Sosa, Deer Park; Billy J. Ellis, Spring, both of TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/951,599

(22) Filed: Sep. 13, 2001

(51) Int. Cl.⁷ .............................................. C08F 279/02

(52) U.S. Cl. .......................... 525/53; 525/263; 525/271; 525/316; 526/65; 526/82; 526/84

(58) Field of Search ........................... 525/53, 263, 271, 525/316; 526/65, 82, 84

(56) References Cited

U.S. PATENT DOCUMENTS

| | | | | |
|---|---|---|---|---|
| 4,311,819 A | * | 1/1982 | Tung et al. | 525/316 X |
| 6,143,833 A | * | 11/2000 | Klussmann et al. | 525/316 |
| 6,303,721 B1 | * | 10/2001 | Latsch et al. | 525/316 X |

* cited by examiner

Primary Examiner—Fred Teskin
(74) Attorney, Agent, or Firm—Michael J. Caddell

(57) ABSTRACT

The present invention discloses processes and apparatus for the efficient and rapid conversion of an elastomeric monomer to a polymerized elastomer, and conjointly, reaction of the resultant rubbery polymer into a monovinylaromatic polymerization reaction to form a rubber-modified polymer; and more specifically teaches a method of polymerizing butadiene and reacting it with styrene monomer to form a transparent rubber-modified impact-resistant polystyrene material exhibiting elastomer concentrations that range from as low as 6 weight percent or lower, to as high as about 50 percent.

12 Claims, 10 Drawing Sheets

FIG. 1
FIG. 2
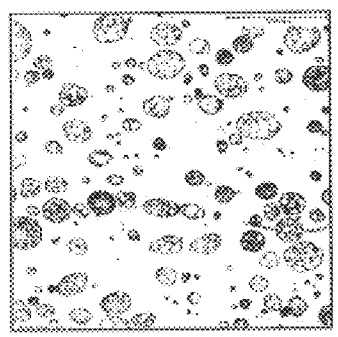
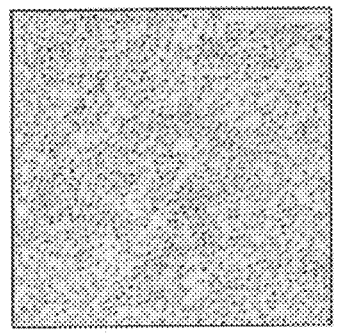
FIG. 3
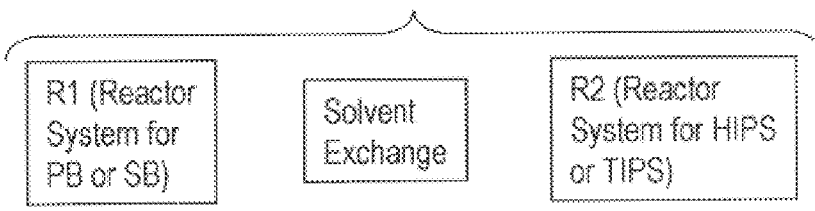
FIG. 4
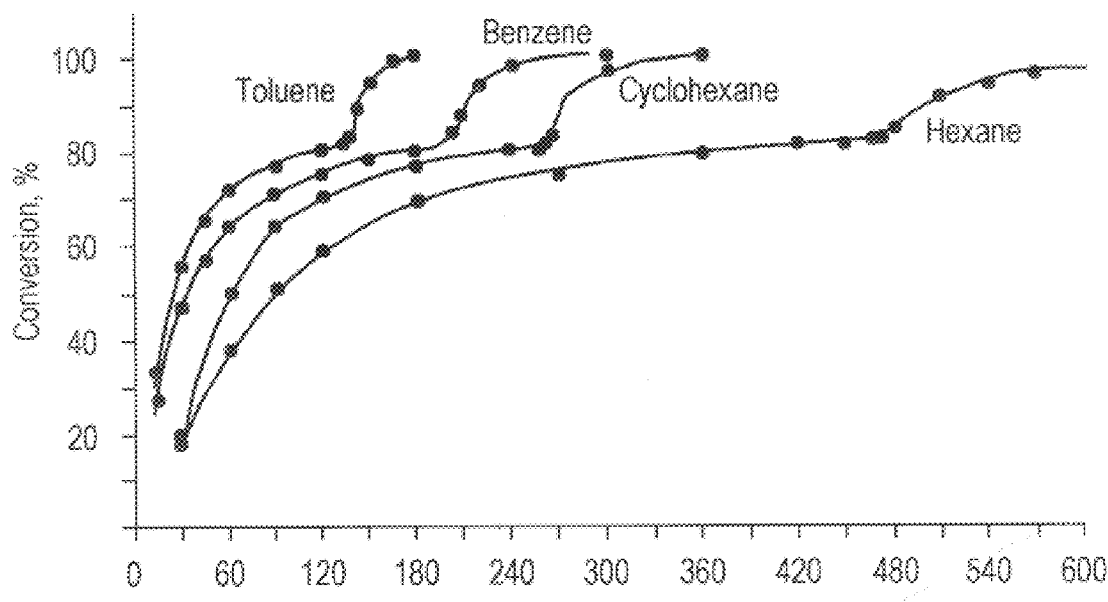
Polymerization of butadiene-styrene in different solvents at 122° F

FIG. 5

| Run # | % solids end of run | Feed Composition Wt % | | Wt % Monomer in Polymer by NMR | | | |
|---|---|---|---|---|---|---|---|
| | | % BD | % SM | % Hexane | % SM | % PB | % BD Reacted |
| 00-22 | 6.6 | 7.4 | 7.5 | 85.1 | 33.7 | 66.3 | 59 |
| 00-23 | 13.7 | 12.6 | 14.6 | 72.8 | 38.4 | 61.6 | 67 |
| 00-24 | 16.8 | 15.4 | 28.7 | 55.9 | 44 | 56 | 61 |
| 00-25 | 15.1 | 15.4 | 28.6 | 56 | 44.5 | 55.5 | 55 |
| | | | | % EB | | | |
| 00-33 | 16.4 | 12.8 | 65.4 | 21.8 | 50.5 | 49.5 | 63 |
| 00-34 | 14.6 | 12.7 | 87.3 | 0 | 58.7 | 41.3 | 47 |
| 00-35 | 11.4 | 11.9 | 81.9 | 6.2 | 59.7 | 40.3 | 38 |
| 00-36 | 18.8 | 8.3 | 86.5 | 5.2 | 71.7 | 28.3 | 64 |

| Run # | % solids end of run | Feed Composition Wt % | | Wt % Monomer in Polymer by NMR | | | |
|---|---|---|---|---|---|---|---|
| | | % BD | % SM | % Hexane | % SM | % PB | % BD Reacted |
| 00-22 | 6.6 | 7.4 | 7.5 | 85.1 | 33.7 | 66.3 | 59 |
| 00-23 | 13.7 | 12.6 | 14.6 | 72.8 | 38.4 | 61.6 | 67 |
| 00-24 | 16.8 | 15.4 | 28.7 | 55.9 | 44 | 56 | 61 |
| 00-25 | 15.1 | 15.4 | 28.6 | 56 | 44.5 | 55.5 | 55 |
| | | | | % EB | | | |
| 00-33 | 16.4 | 12.8 | 65.4 | 21.8 | 50.5 | 49.5 | 63 |
| 00-34 | 14.6 | 12.7 | 87.3 | 0 | 58.7 | 41.3 | 47 |
| 00-35 | 11.4 | 11.9 | 81.9 | 6.2 | 59.7 | 40.3 | 38 |
| 00-36 | 18.8 | 8.3 | 86.5 | 5.2 | 71.7 | 28.3 | 64 |

FIG. 7

| Runs | Fina 530 | Run 59 | Run 60 | Run 65 | Run 66 | Run 70 | Run 71 |
|---|---|---|---|---|---|---|---|
| Feed Composition SM/BD | 77/23 | 75/25 | 80/20 | 67/33 | 73/27 | 72/28 | 62/38 |
| % butadiene | | 2.9 | 2.3 | 4.7 | 3.6 | 3.8 | 6.7 |
| % stryene | | 8.8 | 9.4 | 9.5 | 9.5 | 10 | 10.8 |
| % cyclopentane | | | | | | 83.6 | 79.3 |
| % ethylbenzene | | 52.7 | 85.3 | 83.1 | 84.2 | | |
| % hexane (BuLi carrier | | 35.6 | 2.9 | 2.7 | 2.7 | 3.2 | 2.7 |
| Product | | | | | | | |
| % Solids | 10 | 11.5 | 11.8 | 14.9 | 13.1 | 14.7 | 19.4 |
| Vis. @ R.T. cP | 34.5 | 27 | 20 | 46 | | 184 | 398 |
| NMR Results | | | | | | | |
| % SM | 84.9 | 83.1 | 87.7 | 76 | 81.2 | 82 | 85.1 |
| % vinyl | 2.5 | 3.2 | 2.6 | 4 | 3.5 | 2.4 | 0 |
| % cis | 4.9 | 5.5 | 3.9 | 8.2 | 6.2 | 6.5 | 6.5 |
| % trans | 7.7 | 8.2 | 5.9 | 11.8 | 9.1 | 9.1 | 8.4 |
| Mol. Weights | | | | | | | |
| Mn (000) | 64 | 45 | 41 | 67 | 59 | 84 | 56 |
| Mw (000) | 68 | 59 | 45 | 76 | 63 | 101 | 95 |
| MWD | 1.1 | 1.3 | 1.1 | 1.1 | 1.1 | 1.1 | 1.7 |
| DMA | | | | | | | |
| Tg $^0$C | -40.9 | | | -61 | | -74 | -72 |
| Tan delta | 0.093 | | | 0.2 | | 0.053 | 0.18 |

|  | Finaclear | PB00-65 | PB00-70 | PB00-71 |
|---|---|---|---|---|
|  | 877-54-1 | 877-54-2 | 877-54-3 | 877-54-4 |
| feed g | 234.7 | 277.8 | 255.56 | 277.8 |
| ppm init | 175 | 175 | 175 | 175 |
| % assay | 75 | 75 | 75 | 75 |
| initiator g | 0.05476 | 0.06482 | 0.05963 | 0.06482 |

| 7% Rubber Profile |  | 877-54-1 | 877-54-2 | 877-54-3 | 877-54-4 |
|---|---|---|---|---|---|
| Ramp 1: 120 min @ 110 C |  |  |  |  |  |
| Ramp 2: 60 min @ 130 C |  | 12:30 | 13:00 | 12:45 | 13:30 |
| Ramp 3: 60 min @ 150 C |  | 13:30 | 14:00 | 13:45 | 14:30 |

PROCESS AND APPARATUS FOR CONTINUOUS MANUFACTURE OF ELASTOMER-MODIFIED MONOVINYLAROMATIC COMPOUNDS

FIELD OF THE INVENTION

This invention discloses processes and apparatus for the continuous polymerization of an elastomer monomer into an elastomeric polymer, and reaction of said resulting polymerized elastomer with a monovinylaromatic monomer to form an elastomer-modified transparent monvinylaromatic material.

BACKGROUND OF THE INVENTION

Processes and apparatus for the continuous production of polymerized elastomers such as polybutadiene, polyisoprene, and their copolymers, such as styrene-butadiene rubber (SBR) and styrene-butadiene-styrene (SBS) rubber are well known. Likewise processes and apparatus for producing monovinylaromatic compounds such as polystyrene, alphamethyl-styrene and others have long been known. Also well known are processes and apparatus for making elastomer-modified monovinylaromatic compounds such as polybutadiene-modified polystyrene to serve as high-impact materials. One certain class of such materials is denoted as High Impact Polystyrene (HIPS) which is made from polybutadiene rubber and styrene monomer. Another class of materials which are made from various copolymers and styrene monomer is classified as Transparent Impact PolyStyrene, or TIPS.

The primary difference between a HIPS material and a TIPS material arises from the difference in the morphologies of the two materials' rubber phases. In the HIPS material, the rubber is present as a distribution of different sized, well-defined spherical particles, ranging from about 0.5 up to about 15 microns in diameter. In TIPS materials the rubber phase is present in "domains" that have dimensions that will not refract visible light, and therefore appear to the human eye as transparent.

TIPS materials can be manufactured by extruding blends of an SBS (styrene-butadiene-styrene) rubber that has been blended with a general purpose polystyrene (GPPS). For example, blends containing 40% by weight of a commercial SBS rubber sold by TotalFinaElf of Paris, France, under the tradename "Finaclear 520", when blended with 60% by weight of TotalFinaElf's commercial GPPS material sold under the tradename "Fina GPPS", produce a TIPS that can be used for making clear delicatessen food containers and transparent beverage cups.

However, blending of rubber and polystyrene materials to form TIPS suffers from a major disadvantage, i.e., the cost of manufacture. The many steps of manufacturing a separate commercial rubber material and a separate commercial polystyrene, then having to granulate and then blend the two materials and extrude them, then further pelletize the extruded TIPS materials, introduces numerous expensive steps into the process. An even further disadvantage of such blended TIPS materials involves the great likelihood that the final product will not be totally clear but, due to poor blending and dispersion techniques, will also suffer from the presence of "haze" in the material that greatly reduces its attractiveness as containers for food and beverage. The commercial industry has long needed and lacked a process for manufacturing TIPS materials directly in a reactor to provide ultraclear reactor-grade materials having no haze due to the elimination of the dispersion problem in blending operations. Also, the direct reaction of rubber in polystyrene would be much cheaper than the blending method of manufacture.

Another conventional method of making HIPS and TIPS materials involves starting with a polybutadiene rubber or an SB (styrene-butadiene) copolymer, which is usually supplied in large bales which have to be ground into small particles and then added to a diluent or solvent such as normal hexane, cyclohexane or ethylbenzene, and mixing this with a styrene monomer. This mixture is then polymerized in a typical HIPS or TIPS reactor system, usually consisting of at least one Continuous Stirred Tank Reactor (CSTR). Some examples of conventional rubber-modified polystyrene manufacture are disclosed in U.S. Pat. Nos. 4,271,060; 4,375,524; 4,495,028; 4,567,232; and, 4,686,086. In U.S. Pat. No. 4,777,210 to Sosa et al, a HIPS process is disclosed which utilizes a first CSTR type of reactor denoted as a Pre-Inversion Reactor, or PIR, to react the mixture of styrene monomer and dissolved polybutadiene rubber up to a solids level just below the inversion point. The written descriptions of the above-cited six U.S. patents are hereby incorporated herein in by reference.

Two patents to Knoll, U.S. Pat. No. 5,795,938 and 5,990,236, teach a process for making rubber modified styrenics in which a first reactor polymerizes a pure styrene monomer in cyclohexane to 99.99% conversion to polystyrene; and in a second reactor a 60/40 mixture of butadiene and styrene monomer in cyclohexane solvent is reacted to about 15% solids using a butyl lithium accelerator. The resultant butadiene/styrene solution is then physically mixed with the 99.99% polystyrene material to form a blended rubber-polystyrene material.

An improvement over the above cited conventional processes is that disclosed in U.S. Pat. No. 6,143,833 to Klussman et al, wherein a polybutadiene rubber is manufactured using butadiene monomer dissolved in a solvent, which rubber is polymerized in a reactor system in the same physical area as a HIPS reactor system. This material is then run through a solvent exchange system to remove the solvent from the butadiene rubber and then the rubber is added to the HIPS reactor system with styrene monomer to complete the HIPS process. This process removes the steps of making a rubber at a conventional rubber manufacturing facility, drying and compressing the rubber, transporting it to the HIPS plant, grinding the rubber bales into granules, dissolving the granules in a diluent compatible with styrene polymerization, and then physically mixing the dissolved rubber with the styrene monomer and polymerizing the final product in the HIPS reactor system. Usually in such conventional systems, the rubber is manufactured at a completely different location altogether, and sometimes even in a different country, from where the final HIPS products are made.

Another improvement of the prior art processes of HIPS manufacture involves the processes and apparatus disclosed in a copending application Ser. No. 09/823,535, filed by Sosa et al, on Mar. 30, 2001, entitled "PROCESS FOR MANUFACTURING IMPACT RESISTANT MONOVINYLAROMATIC POLYMERS". This process utilizes as a first reactor a stirred elongated upflow reactor to replace the initial preheater and CSTR type of reactor of conventional HIPS processes to provide higher conversion rates, better temperature control and better rubber particle size distributions. The written descriptions in the above described Klussman, et al, patent and Sosa, et al, patent application are incorporated by reference herein.

All of the prior art processes and apparatus described hereinabove except the Klussman et al patent, suffer from the disadvantage of the many steps required to make HIPS material, including manufacturing rubber prior to incorporating it into the styrene polymerization process, transporting the rubber to the HIPS site, and then grinding and dissolving the rubber in a styrene-compatible solvent and incorporating it into the HIPS reactors along with the styrene monomer.

SUMMARY OF THE INVENTION

The present invention overcomes the disadvantages of the prior art for manufacturing transparent impact polystyrene by providing processes and apparatus for polymerizing an elastomer which possesses a random SB-block S structure, using a solvent compatible with styrene polymerization, in an apparatus immediately adjacent to the styrene reactor system; then feeding the elastomer/solvent solution into a solvent exchange system where solvent is exchanged with styrene monomer, then feeding the elastomer and styrene monomer into the impact polystyrene reactor system to polymerize the styrene monomer and form the transparent impact-resistant polystyrene.

BRIEF DESCRIPTION OF THE DRAWINGS

FIG. 1 is a photomicrograph showing the morphology of a HIPS material at a magnification scale of 5000 nm;

FIG. 2 is a photomicrograph showing the morphology of a TIPS material at a magnification scale of 500 nm;

FIG. 3 is a schematic illustration of the manufacturing process of the present invention;

FIG. 4 is a graphic illustration of the time rate of conversion of butadiene/styrene mixtures in various solvents;

FIG. 5 is a table of Nuclear Magnetic Resonance characterizations of polybutadiene produced in styrene;

FIG. 7 is a table showing the reaction conditions for materials with high levels of styrene in the reactor;

DESCRIPTION OF THE PREFERRED EMBODIMENTS

Figure 6:
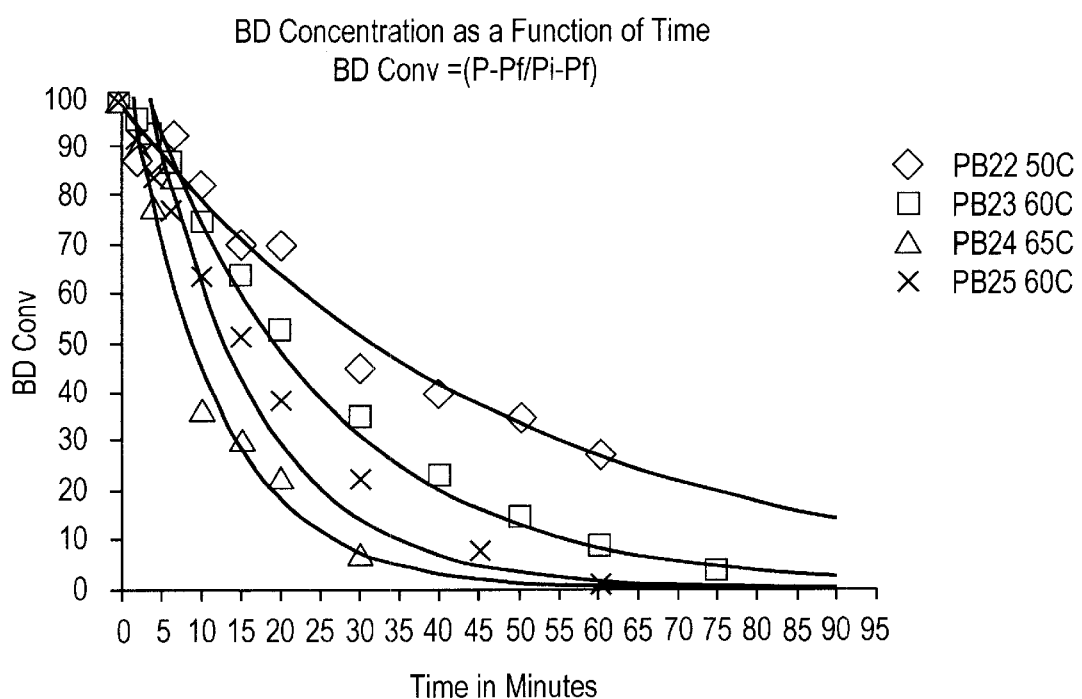
FIG. 6 is a graph of the concentration of butadiene monomer in a polymerizing solution, illustrating the conversion rate of butadiene to polybutadiene over time.

The present invention is directed to making TIPS materials from an elastomer and a monovinylaromatic polymer. The process eliminates many of the intermediate steps between the elastomer manufacture and the monovinylaromatic polymerization reactor system. This is done by polymerizing the elastomer from an elastomer monomer feedstock in a solvent that is compatible with the polymerization reaction for the monovinylaromatic monomer feedstock.

In one preferred embodiment of the invention, the polymers utilized in making TIPS materials consisted of a polybutadiene elastomer and a polystyrene class of monovinylaromatic compound. In this embodiment of the invention, the butadiene monomer is polymerized in a solvent comprising a styrene monomer, using an elastomer reactor system that is unique to TIPS manufacture. Upon satisfactory polymerization of the butadiene and styrene into random Styrene-Butadiene rubber, this elastomer reaction solution receives additional styrene monomer and is then reacted in a TIPS reactor system to form a Transparent Impact Polystyrene material.

In a similar manner, TIPS can be manufactured in the same equipment described in the above-mentioned Klussman, et al, patent by selecting appropriate SB or SBS structures that will form lamellar or rod morphologies. Thus, in the first reactor, a random SB rubber with a block of polystyrene (PS) is made with a structure represented by the following symbolic representation:

BBBSBBSBBBBSSBSSSSSSSSSSSSS wherein B represents a rubber molecule and S is a styrene molecule.

This structure is the most likely to occur in such a reaction, since it is well known that a butadiene-rich random SB rubber results from the butadiene reacting faster than the styrene, causing the butadiene to be depleted before the styrene. The Klussman system is utilized to form the random SB-block PS structure shown above in a diluent of cyclohexane or cyclopentane. This solution is then sent to the sol vent exchange section where the diluent is replaced by or "exchanged" with styrene monomer.

After the "exchange" of styrene monomer for the cyclohexane or cyclopentane diluent, the resulting solution is then sent to a TIPS reactor system where additional structure changes occur to the molecule. These changes are the result of the grafting which occurs when the SB portion is polymerized in the presence of peroxide initiators. The resulting molecular structure can be symbolized by the following representation that is thought to occur as the random SB-PS material is polymerized into a graft-random SB-PS structure:

----BBBSBBSBBBBBSSBSSSSSSSSSSSS----
|
(Graft PS)

Referring now to the drawings, and more particularly to FIG. 1, a photomicrograph is shown which represents the morphology of a standard TIPS material. FIG. 2 offers a photomicrograph of the morphology of a standard TIPS material. A comparison of the two photos shows why TIPS materials are transparent. The structure of the rubber particles in the TIPS material is smaller than the wavelength of visible light, thereby allowing light to pass through the material unhindered, rendering the final product transparent;

whereas the rubber particles in the HIPS material are not smaller than the wavelength of visible light and the resultant HIPS material is hazy to solid white in appearance.

FIG. 3 is a schematic representation of the reactor system utilized to manufacture TIPS materials according to the present invention. For a more detailed description of this system refer to the Klussman patent, which was incorporated by reference herein. Generally, the reactor system of FIG. 3 comprises a first reactor R1, a Solvent Exchange Reactor SER, and a TIPS formation reactor R2. Random SB-PS material is formed in R1 similar to the method of manufacturing HIPS material as described by Klussman. Butadiene and styrene monomers are added to a compatible diluent such as hexane, cyclohexane or cyclopentane, and introduced into reactor R1. Simultaneously, a polymerizing catalyst such as butyl lithium, is added to the feed solution.

Since the rate of polymerization of butadiene into rubber at 50 degrees C. is about 60 times greater than the rate of polymerization of styrene into polystyrene, cooling is necessary to allow removal of the exothermic heat of reaction and thereby slow the butadiene reaction down to a controllable level. Once all of the butadiene is polymerized in the butadiene/styrene solution, the styrene will start to rapidly polymerize, so that it is necessary to "kill" or neutralize the reaction as the solution exits reactor R1 and enters the solvent exchange reactor SER. This can be done by the addition of a neutralizer such as methyl alcohol or other alcohol or a phenol to neutralize the polyanions on the ends of the butadiene and polystyrene chains.

It is possible to vary and control the elastomer concentrations in the final TIPS product by adjusting more than one operating parameter of the process illustrated in FIG. 3. For example, the elastomer concentration of the solution as it goes from R1 to the SER can be as high as 30 weight percent, depending on the amount of elastomer initially added to the reaction, and depending upon the molecular weight of the constituents involved. The molecular weight of the elastomer can be controlled by varying the amounts of organo-lithium initiator used in the reactor.

Once the reaction solution goes to the SER, the elastomer concentration can also be varied by adjusting the ratio of styrene/diluent that is used; and finally, the level of the SB-block PS in the final TIPS product can be varied depending on the conversion rate in the final reactor, R2.

In one example, if a reaction solution is created in the first reactor by varying the above-mentioned parameters so that the solution has an elastomer concentration consisting of 12 weight percent random SB-PS coming out of R1, and the SER is run at conditions to achieve a one-to-one hexane/styrene exchange, the solution would enter R2 with a 12% SB-PS concentration. By then polymerizing styrene monomer in R2 to a level of just 60% (decimally 0.60), the final elastomer concentration coming out of R will be increased by a factor of 1/.60, or to 20% in the final TIPS product.

By setting original reaction concentrations to end up with an elastomer concentration (random SB-block PS) of 30 wt. % in the reaction solution coming from R1, the operator can end up with an elastomer concentration as high as 50 wt. %; i.e., 30%/.60=50%. It is believed that the maximum practical level of elastomer achievable in R1 is in the range of about 30 wt. %, so that the maximum practical elastomer concentration obtainable in the final TIPS product would be about 50%. A lower practical level of elastomer content for TIPS material would be about 6 wt. %, although lower levels are certainly possible with this process.

The advantages of the process in making TIPS materials are obvious from this description given for FIG. 3:

a. a wide range of random SB-PS elastomer TIPS materials can be made by changing the molecular weight and the ratio of butadiene to styrene in reactor R1;
b. the random SB-PS solution can be concentrated by adjusting the styrene/diluent ratio used in the SER; and,
c. the concentration of SB-PS in the final product can be changed by the amount of styrene converted in reactor R2.

FIG. 4 is a graphic representation of the times of conversion of a 75/25 BD/SM solution in different solvents at 122 degrees F. It can be seen from the graph that the fastest reaction of butadiene occurs in a toluene solvent and addition of the styrene occurs at about 120 hours. In toluene, addition of the styrene achieves the fastest BD/SM reaction as indicated by the steepness of the curve after 120 hours. The slowest solvent appears to be hexane which requires almost 480 hours for the butadiene to react to 80% conversion and which then allows a very slow or gradual BD/SM conversion slope after the addition of the styrene. Because of these slow rates of conversion, the conventional polybutadiene manufacturing process using one of these solvents as the butadiene diluent is very slow and must be so to provide control of the rapid exothermic reaction. However, as a result, the rates of conversion are also slow for conventional polybutadiene manufacture.

FIG. 5 is a table showing the properties of polybutadiene/styrene reactions in hexane wherein the ratios of BD to SM range from about 50/50 up to about 35/65, using a butyl lithium initiator.

FIG. 6 is a graphic representation of the time-rate of conversion of butadiene into polybutadiene in the reactions utilizing hexane as a solvent, i.e., runs #22–25. Each line represents the amount of unreacted butadiene in the solution at any particular time. It can be seen that the concentration of BD is higher over time for run #22 and the lowest for run #24. This graph shows that temperature and reaction time can be obtained that are suitable for a commercial process. The benefit from this is clearly that the reaction of BD into PB is much faster in SM but is still under control, thus allowing a controlled increase in conversion rates in the BD reactor and a consequent increase in commercial production rates with no adverse economic costs.

FIG. 7 is a table that shows the reaction conditions for Runs carried out at high SMIBD ratios. The characterization of the materials is also shown.

Figure 8:
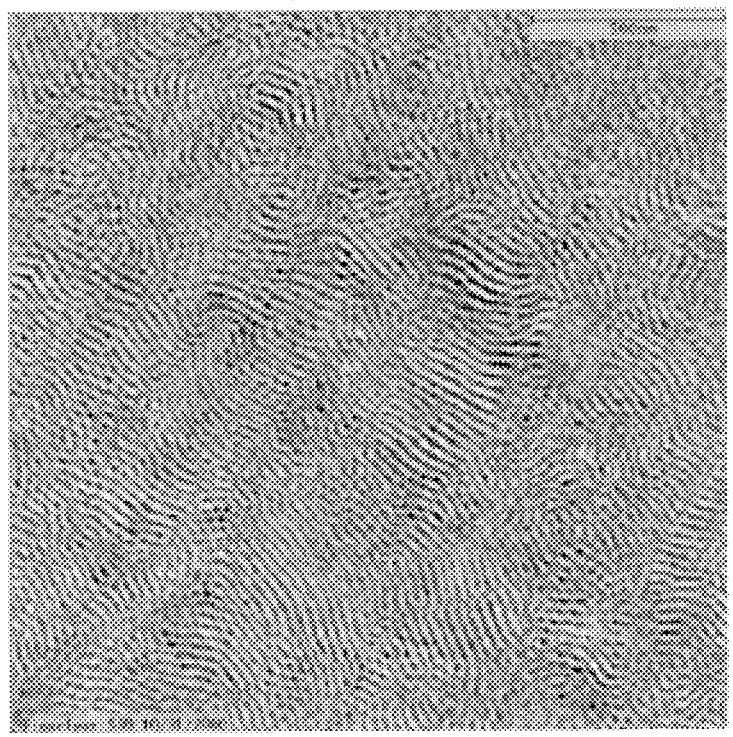
FIG. 8 is a photomicrograph of a commercial SBS block copolymer rubber used to make TIPS materials.
Figure 9:
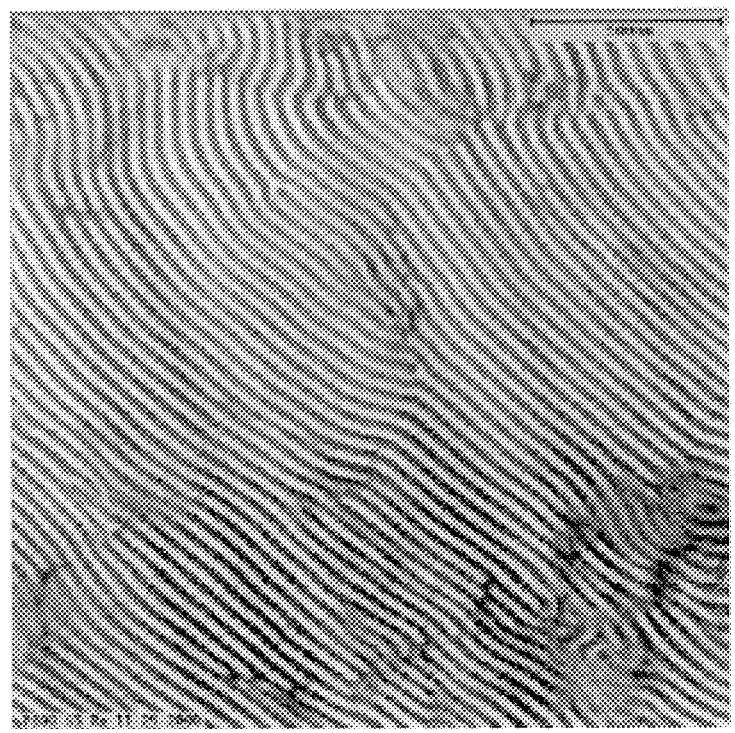
FIGS. 9–11 are Tunneling Electron Micrographs (TEM) of materials manufactured in the initial reactor of the present invention.
Figure 10:
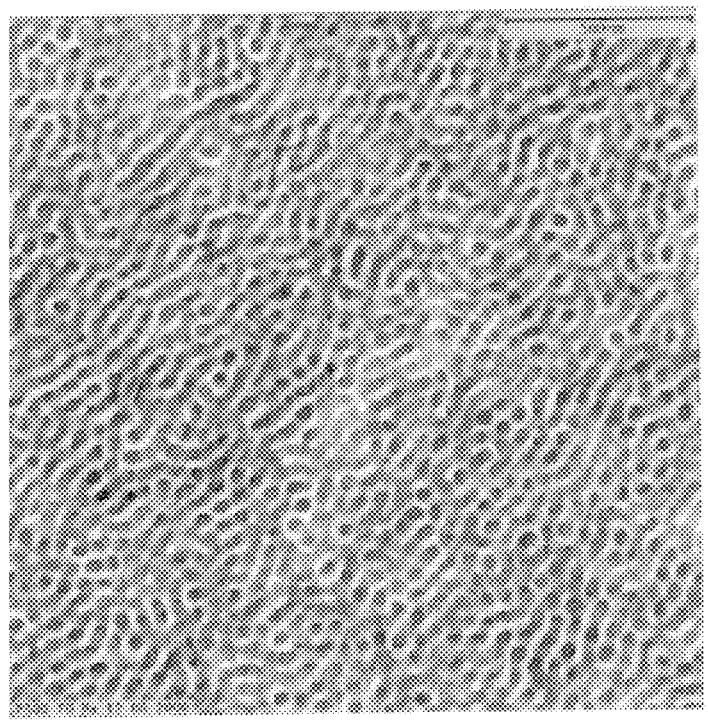
Figure 11:
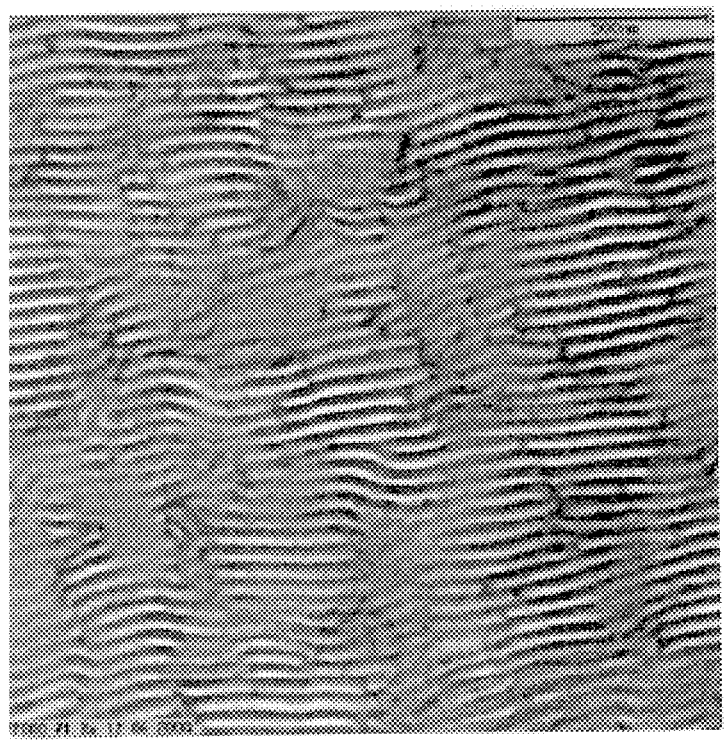

FIG. 8 shows the morphology of a commercial Finaclear 530 (ATOFINA Petrochemicals, Houston, Tex.). FIGS. 9, 10 and 11 show the morphologies that are obtained in Runs 65, 70 and 71. It can be seen that the morphologies of the products show lamella and rod structures; thus, the materials from the R1 reactor system are clearly illustrated as being very useful for manufacturing TIPS.

Figures 12, 13:
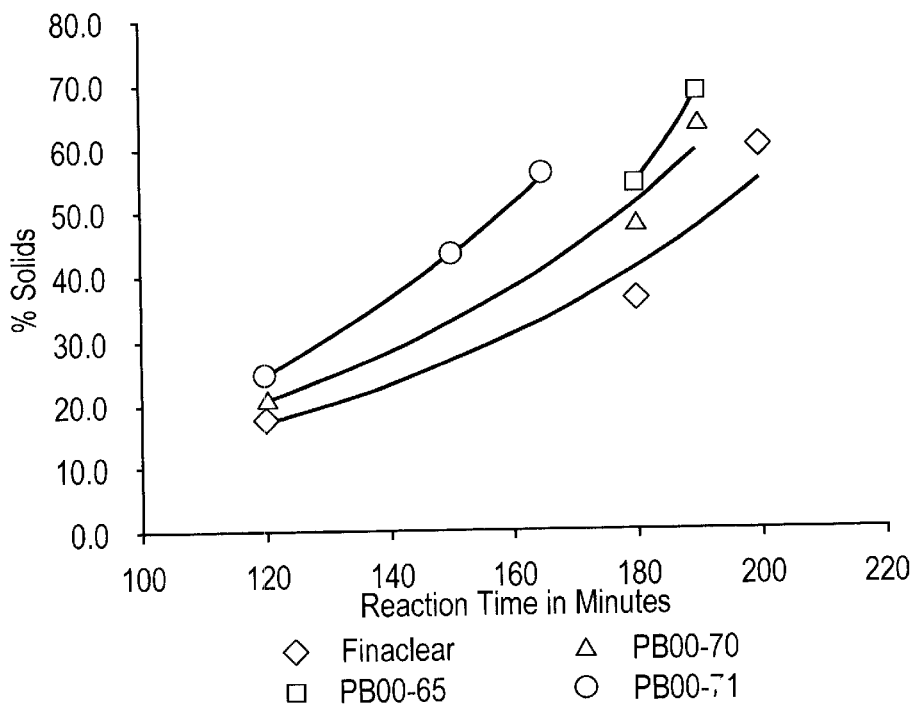
FIG. 12 is a table illustrating the results of reacting the rubber of FIG. 8 with a random SB in styrene in the reactor of the present invention to form TIPS material.
FIG. 13 is a graphic representation of the results obtained by polymerizing the rubber of FIG. 8 with a random SB in the reactor of this invention.

FIG. 12 is a table of the reaction conditions for laboratory runs 65, 70, and 71 and a run using the commercial rubber, Finaclear 530.

FIG. 13 is a graphical representation that shows the polymerization conditions of solutions obtained from dissolving Finaclear 530, and from Runs 65, 70 and 71 in styrene. These solutions would have similar compositions as those exiting the Solvent Exchange system of FIG. 3. This figure shows % solids vs reaction time using the initiator Lupesol 233 (Atofina Chemicals, King of Prussia, Pa.). The conditions selected are those utilized in the R2 reactor system employed to make HIPS or TIPS.

Figure 14:
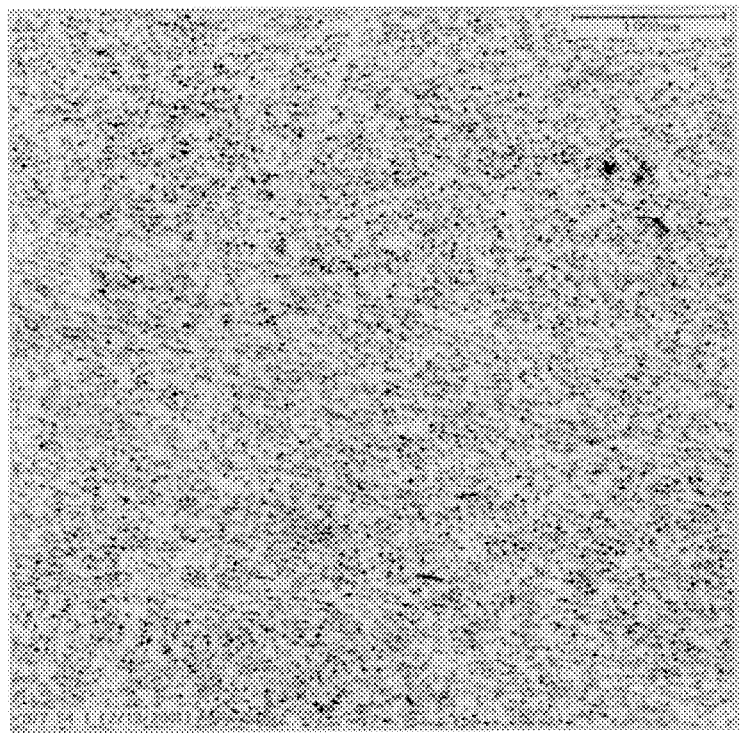
FIG. 14 is a TEM photomicrograph of a TIPS material manufactured with the rubber of FIG. 8.
Figure 15:
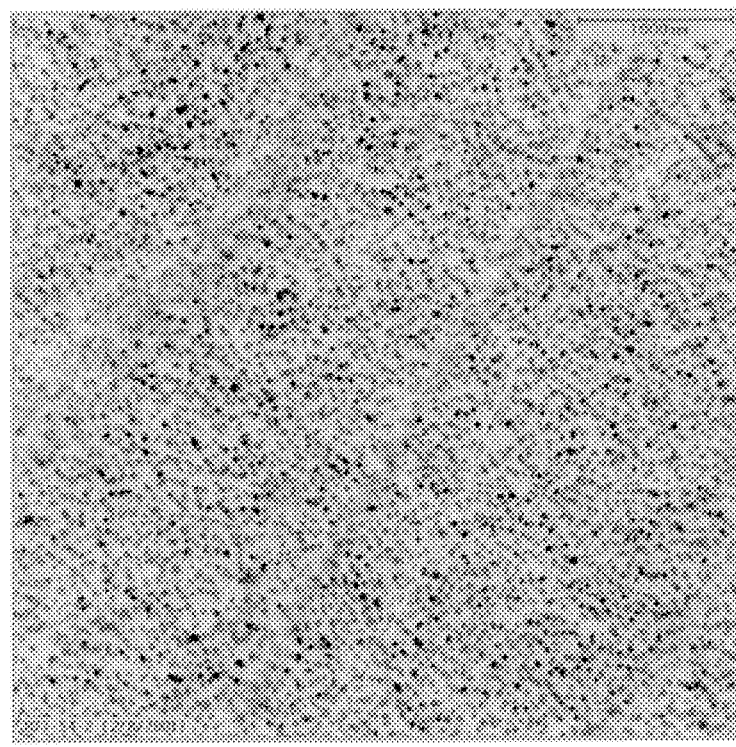
FIG. 15 is a TEM photomicrograph of the TIPS material manufactured with the material made in the initial reactor as illustrated in FIG. 9; manufactured with the material made in the initial reactor as illustrated in FIG. 10.
Figure 16:
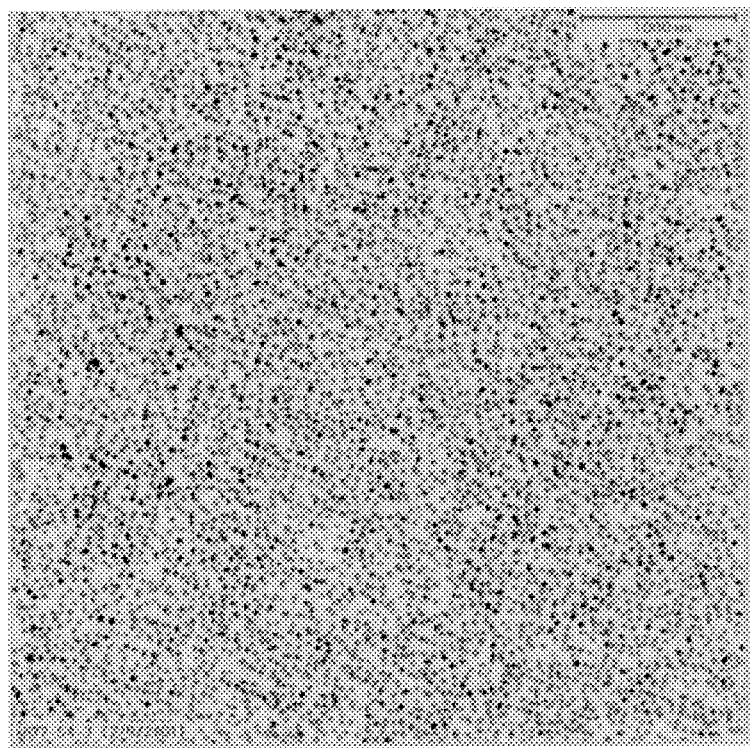
FIG. 16 is a TEM photomicrograph of the TIPS material manufactured with the material made in the inital reactor as illustrated in FIG. 10.
Figure 17:
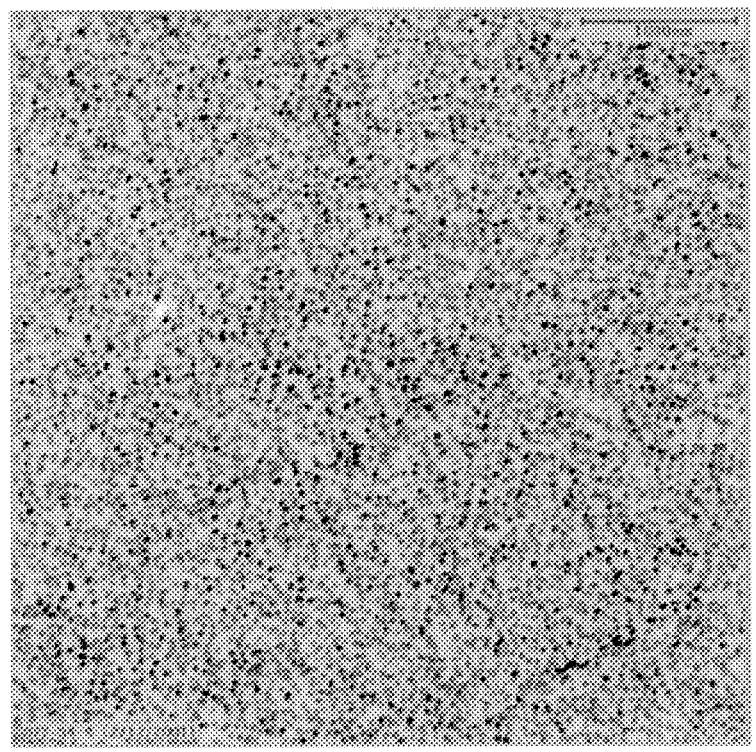
FIG. 17 is a TEM photomicrograph of the TIPS material manufactured with the material made in the initial reactor as illustrated in FIG. 11; and, FIG. 18 is a graphic representation of the results of a Dynamic Mechanical Analysis (DMA) of a TIPS material manufactured in the final reactor of the present invention.

FIG. 14 shows the morphology of TIPS manufactured using Finaclear 530. FIGS. 15, 16 and 17 show the morphology of TIPS obtained using materials from Runs 65, 70 and 71. It is can be seen that the morphology of all of the samples are rod morphologies, similar to those obtained by blending Finaclear 530 with GPPS.

Figure 18:
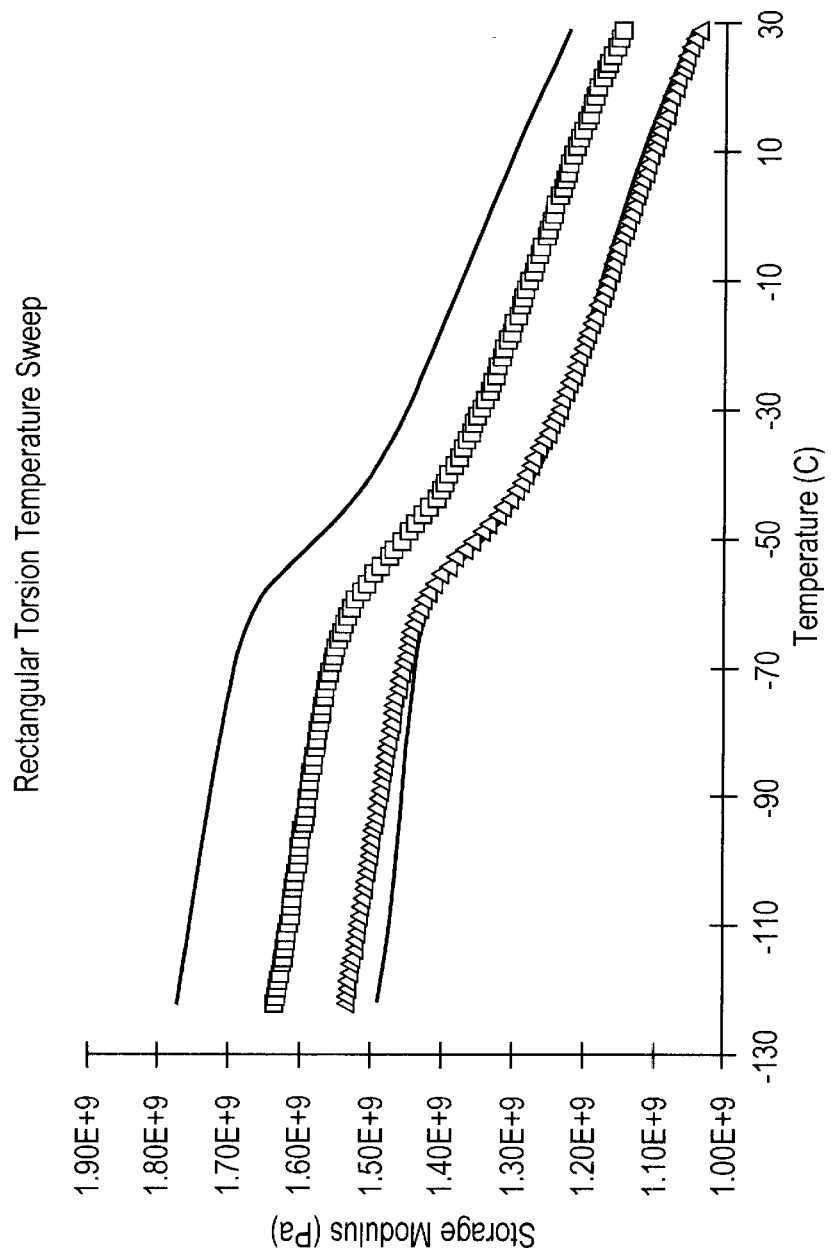

FIG. 18 shows the Storage Modulus (G') from −120° C. to +30° C. It can be seen that the material made with commercial Finaclear 530 has a modulus that is between those produced with laboratory samples. The glass transition temperature of the elastomer is identified by the abrupt change in G' that occurs around around −50° C. The magnitude of G' indicates that the laboratory samples can be made stiffer (higher G') or more flexible (lower G'). The importance of this observation is that the resulting TIPS materials can be made stiffer or more flexible by changing the ratio of SM/BD in R1.

Conclusion

The results obtained by the present inventive process and apparatus clearly indicate that at 50–60 degrees C., polymerization of 1,3-budadiene in the presence of a styrene monomer solvent yields random copolymers of butadiene and styrene. The final products consist of styrene polymerized in the presence of SBR's having 50–60% styrene, and yield highly crosslinked materials that are clear and homogenous. The process is capable of manufacturing commercial TIPS materials at much less cost and much higher productivity levels.

What is claimed is:

1. A process for forming an impact-resistant rubber-modified monovinylaromatic compound comprising the steps of:
   a. flowing a stream of reactive elastomer monomer through a first reactor assembly;
   b. adding a stream of diluent containing monovinylaromatic monomer to said elastomer monomer stream during said flowing step;
   c. adding a polymerization initiator to said combined streams of monomers, said initiator consisting of an elastomer polymerization initiator, during said flowing step;
   d. subjecting said combined streams of monomers to flow shear in said reactor assembly until a significant portion of said elastomer monomer has polymerized into elastomer polymer;
   e. adding a neutralizer compound to said combined monomer stream to stop polymerization of said elastomer;
   f. flowing said combined monomer stream into a solvent exchange assembly to remove diluent by exchange with styrene monomer; and,
   g. flowing said combined monomer stream into a second reactor assembly and adding monovinylaromatic monomer to said stream to react therewith and form a transparent elastomer-modified polymer.

2. The process of claim 1 wherein said elastomer monomer is butadiene, said monovinylaromatic monomer is styrene, and said diluent is cyclohexane or cyclopentane.

3. The process of claim 2 wherein said initiator is an organolithium.

4. The process of claim 2 wherein said neutralizer is selected from the group consisting of alcohols and phenols.

5. The process of claim 2 wherein the ratio of styrene to butadiene in said first reactor assembly is initially about 70–90 parts styrene to about 10–30 parts butadiene.

6. The process of claim 5 wherein the weight percent of polybutadiene in the finished product is about 6–50% of the total product weight.

7. The process of claim 2 further comprising the step of adding a styrene initiator to said second reactor assembly.

8. The process of claim 7 wherein said styrene initiator comprises a peroxide.

9. The process of claim 6 wherein said polybutadiene concentration in the final product is controlled by varying the ratio of butadiene to styrene added to said first reactor assembly.

10. The process of claim 6 wherein said polybutadiene concentration in the final product is controlled by controlling the molecular weight thereof by varying the amount of organo-lithium initiator utilized therein.

11. The process of claim 6 wherein said polybutadiene concentration in the final product is controlled by varying the ratio of styrene to diluent used in said solvent exchange assembly.

12. The process of claim 6 wherein said polybutadiene concentration in the final product is controlled by controlling the level of conversion of styrene monomer to polymer in said second reactor assembly.

* * * * *